(12) United States Patent
Frisch

(10) Patent No.: US 7,089,701 B2
(45) Date of Patent: Aug. 15, 2006

(54) GLUE BOARD AND PACKAGING ASSEMBLY

(76) Inventor: Steven Frisch, 170 - 53rd St., Brooklyn, NY (US) 11232

( * ) Notice: Subject to any disclaimer, the term of this patent is extended or adjusted under 35 U.S.C. 154(b) by 0 days.

(21) Appl. No.: 10/763,456

(22) Filed: Jan. 23, 2004

(65) Prior Publication Data

US 2005/0160660 A1   Jul. 28, 2005

(51) Int. Cl.
*A01M 1/14* (2006.01)
(52) U.S. Cl. .......................................... 43/114
(58) Field of Classification Search ................. 43/114, 43/115, 116, 58, 107
See application file for complete search history.

(56) References Cited

U.S. PATENT DOCUMENTS

| | | | | |
|---|---|---|---|---|
| 486,138 A | * | 11/1892 | Thum | .......................... 43/114 |
| 2,328,590 A | * | 9/1943 | Weil | ............................. 43/131 |
| 3,025,630 A | * | 3/1962 | Silvey | .......................... 43/131 |
| 4,385,465 A | * | 5/1983 | Palmeri | .......................... 43/58 |
| 5,384,981 A | | 1/1995 | Cohen | |
| 5,398,442 A | | 3/1995 | Musket | |
| 5,477,636 A | | 12/1995 | Musket | |
| 5,572,825 A | * | 11/1996 | Gehret | ......................... 43/114 |
| 5,577,342 A | | 11/1996 | Johnson | |
| 5,950,353 A | | 9/1999 | Johnson | |

* cited by examiner

*Primary Examiner*—T. Nguyen
(74) *Attorney, Agent, or Firm*—Bernard Malina; Malina & Associates, P.C.

(57) ABSTRACT

A glue board assembly includes a first substrate member which has a first adhesive layer and a release member formed with a release layer overlying the first adhesive layer. A second substrate member has a second adhesive layer. The second substrate member is disposed overlying the release member with the second adhesive layer in contact with the release layer. The release layer enables a user to peel the first and the second substrate members apart thereby exposing the adhesive layers for use in entrapping vermin.

13 Claims, 4 Drawing Sheets

GLUE BOARD AND PACKAGING ASSEMBLY

FIELD OF THE INVENTION

The present invention relates generally to the field of glue traps for the elimination of rodents and more particularly, to a glue board and packaging assembly.

BACKGROUND OF THE INVENTION

The prior art related to glue traps and glue boards includes the following U.S. patents.

U.S. Pat. No. 5,577,342 to Johnson et al. for a "Rodent Control Glue Board" shows a device which includes a thermo formed board which has protruding dam walls which define reservoirs. The reservoirs contain glue for entrapment of rodents. The board has a rim and a paperboard sleeve extends between the rim of a first board and the rim of an overlying inverted second board.

U.S. Pat. No. 5,572,825 to Gehret for a Glue Trap shows a trap with top and side openings which allow vermin to enter the interior of the trap. The interior of the trap includes adhesive for entrapment of the vermin.

U.S. Pat. No. 5,950,353 to Johnson et al. for a Glue Board With Aggressive Mechanical Surface shows a tray with upwardly projecting side walls. The side walls form a reservoir containing glue for entrapment of rodents. The tray includes a plurality of ridges which extend upwardly to retain the glue.

U.S. Pat. No. 5,477,636 to Musket for a Preassembled Glue Trap shows a tunnel-like glue trap which is formed from a folded blank of paperboard. Each wall of the tunnel has a push-in or tear-out panel which form access openings.

U.S. Pat. No. 5,398,442 to Musket shows a pair of trays which are folded along a common edge in a rim-to-rim configuration for shipment. Before use, the trays are separated by removing a tear strip to expose an adhesive surface.

U.S. Pat. No. 5,384,981 to Cohen for a Glue Board shows a sheet of cardboard which has a glue layer. The sheet has a self-adherent tear-away border so that a trap forms its own packaging. The sheet may be folded to form a tent-like structure with open ends.

Despite the developments in the prior art, there remains a need for a relatively low cost glue trap and packaging assembly which uses a minimum amount of packaging materials.

OBJECTS AND SUMMARY OF THE INVENTION

It is an object of the present invention to provide a glue board and packaging assembly which incorporates a release sheet which is packaged between opposing glue layers.

Another object of the present invention is to provide a glue board and packaging assembly in which a pair of glue boards requires only a single release member.

Another object of the present invention is to provide a glue board and packaging assembly which does not rely on the use of tear-away strips prior to operation.

Another object of the present invention is to provide a glue board and packaging assembly which rely on a minimum of packaging materials thereby minimizing waste materials and resulting in low overall cost.

Other objects and advantages of the present invention will become apparent hereinafter.

In accordance with the present invention, there is provided a glue board and packaging assembly which include a first substrate member which has a first adhesive layer deposited thereon and a release member overlying the first adhesive layer. A second substrate member has a second adhesive layer deposited thereon. The second substrate member is disposed overlying the release member with the second adhesive layer in contact with the release layer. The release layer enables a user to peel the first and second substrate members thereby exposing the adhesive layers for use in entrapping vermin.

BRIEF DESCRIPTION OF THE DRAWINGS

Other important objects and advantages of the invention will be apparent from the following detailed description, taken in connection with the accompanying drawings, in which.

DETAILED DESCRIPTION OF THE INVENTION

With reference to the drawings in which like reference numbers designate like or corresponding parts throughout, there is shown in FIGS. 1–4 a glue board packaging assembly made in accordance with the present invention.

Figure 2:
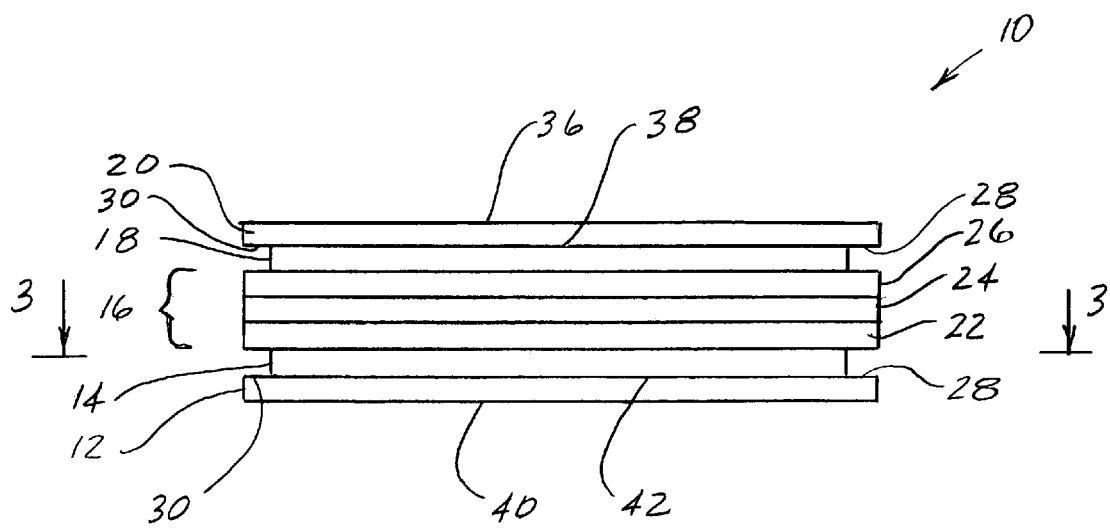
FIG. 2 is a cross-sectional view taken along the line 2—2 of FIG. 1.
Figure 3:
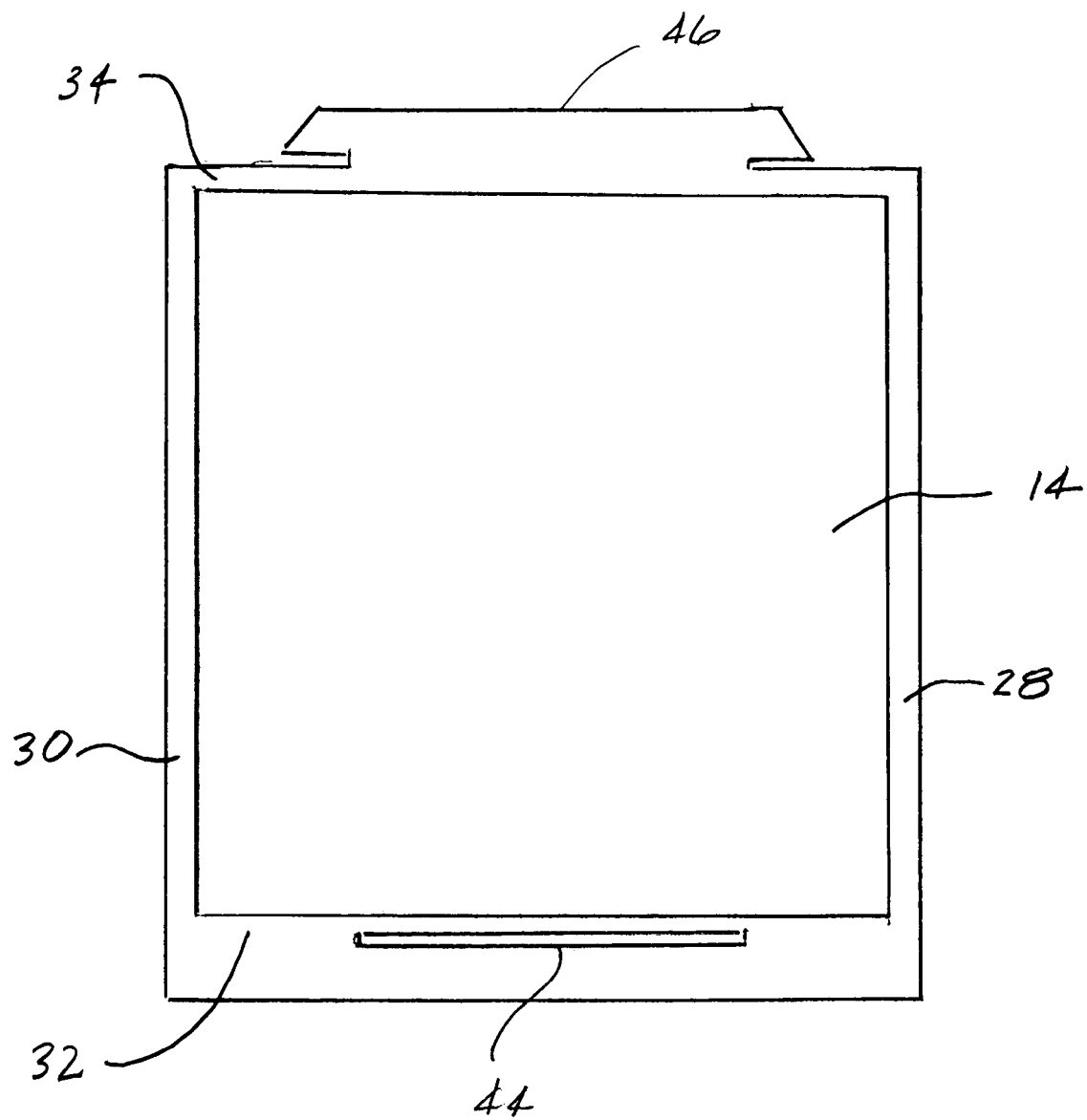
FIG. 3 is a cross-sectional view taken along the line 3—3 in FIG. 2.

As is best shown in FIG. 2, the glue board and packaging assembly 10 includes a first substrate member which is formed by a first paste board or card board layer 12, an adhesive layer 14, a double-sided release member 16, a second adhesive layer 18, and a second substrate member which is formed by a second paste board or cardboard layer 20. The release member 16 includes a first release layer 22, a plastic film or paper layer 24 and a second release layer 26. The release layers 22, 26 are in the nature of silicone layers sand in particular fluorosilocone layers.

The surfaces 36, 38, 40, 42 of the layers 12, 20 may contain pre-printed indicia related to the use of the assembly 10.

Figure 1:
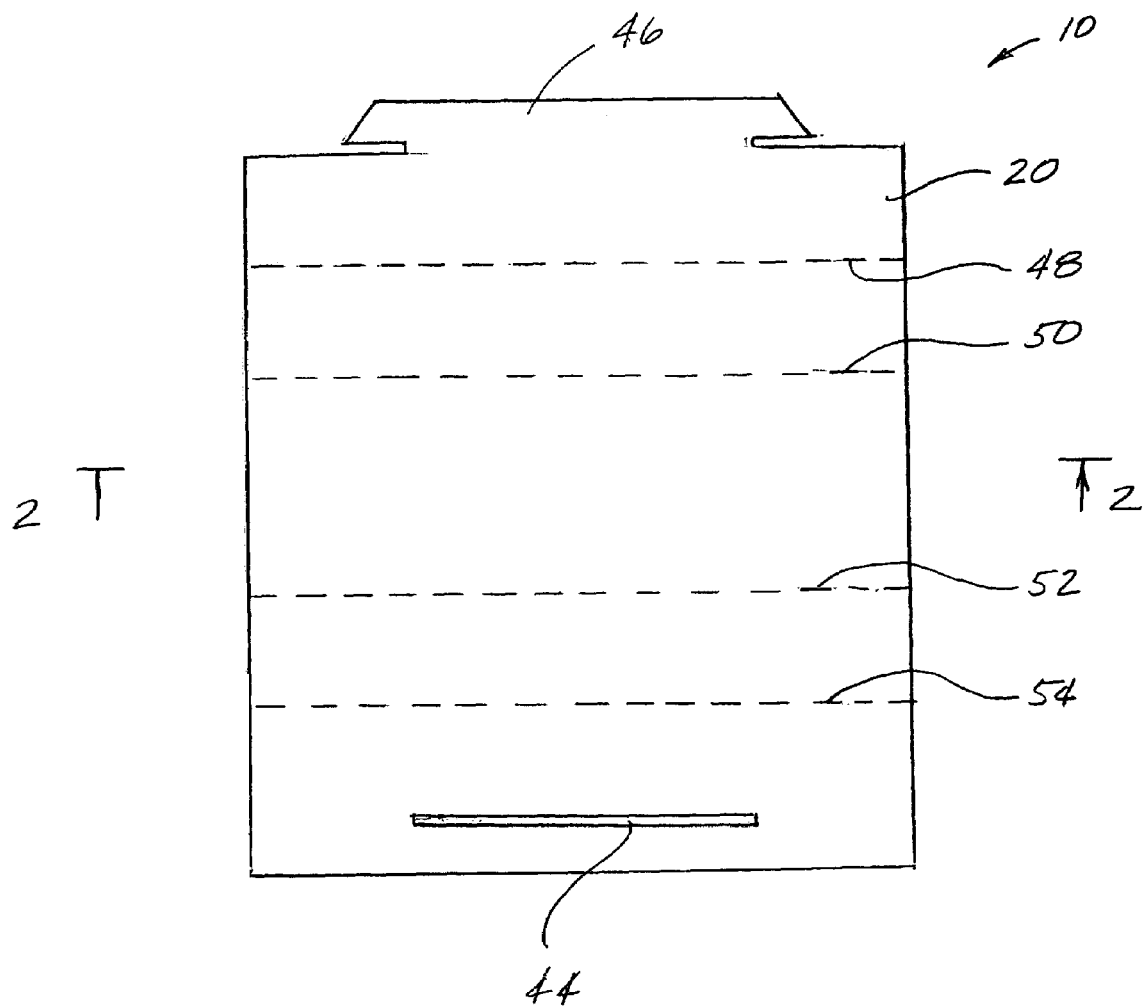
FIG. 1 is an overall plan view of a glue board packaging assembly made in accordance with the present invention.
Figure 4:
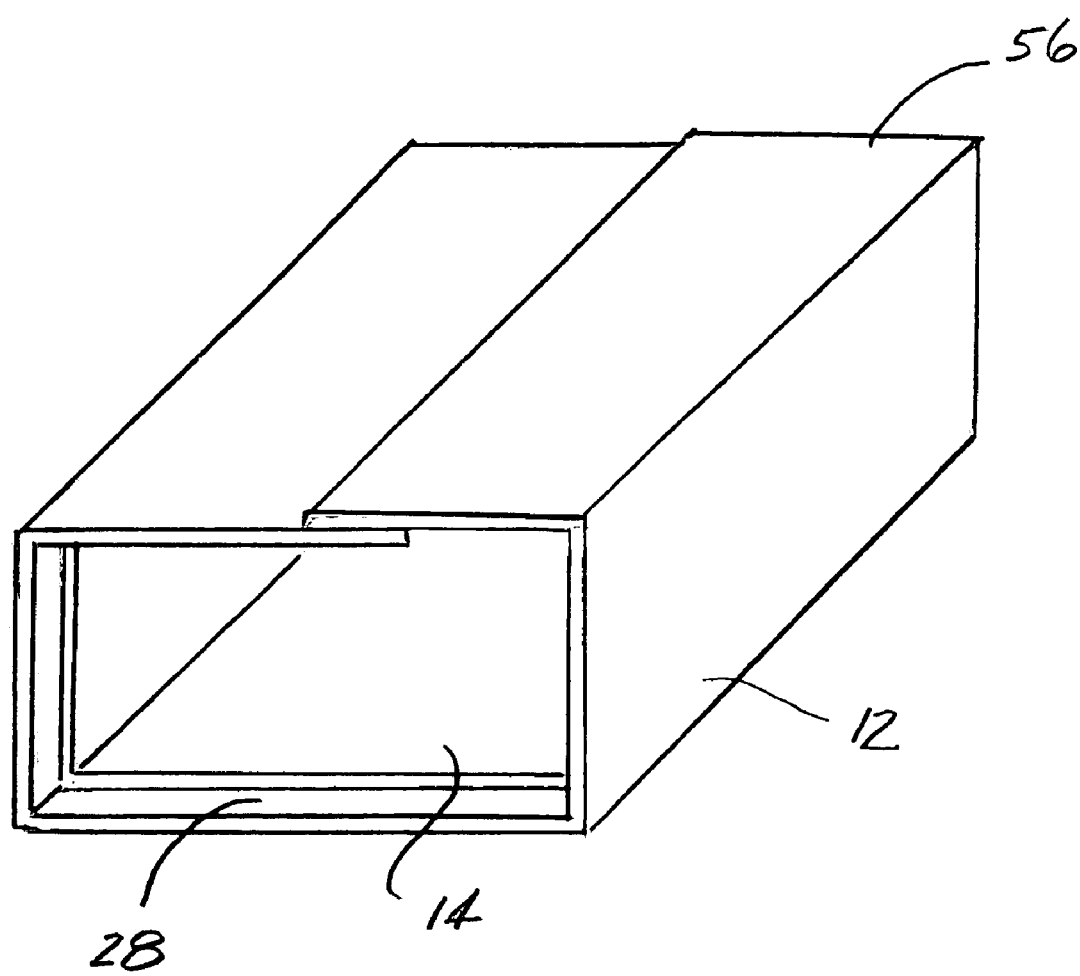
FIG. 4 is a perspective view of an assembled glue board.

FIG. 1 shows a pre-punched slot 44 formed in the lower boarder area 32 and a tab 46 which is formed in the upper border area 34. FIG. 1 also shows the location of transverse, pre-scored lines formed on the layer 20 which are indicated by broken lines 48, 50, 52, 54. During use, the prescored lines 48, 50, 52, 54, the slot 44 and the tab 46 facilitating folding each the layers 12, 20 into a box-like configuration 56 as shown in FIG. 4.

The foregoing specific embodiment of the present invention as set forth in the specification herein is for illustrative purposes only. Various deviations and modifications may be made within the spirit and scope of the invention without departing from the main theme thereof.

What is claimed is:

1. A glue board and packaging assembly for eliminating rodents, the assembly consisting of two glue board traps, the assembly comprising:

a first substrate which is of board construction;

a first adhesive layer deposited on said first substrate, the first adhesive layer being effective to entrap rodents;

a release member which is a thin flexible member having first and second opposing surfaces with each opposing surface having a silicone layer deposited thereon;

a second substrate which is of board construction;

a second adhesive layer deposited on said second substrate, the second adhesive layer being effective to entrap rodents; and wherein the first adhesive layer overlays and contacts one of the silicone layers and the second adhesive layer overlaps and contacts the other of the silicone layers.

2. The glue board and packaging assembly as claimed in claim 1 wherein said thin flexible member comprises a paper member.

3. The glue board and packaging assembly as claimed in claim 1 wherein said thin flexible member comprises a plastic member.

4. The glue board and packaging assembly as claimed in claim 1 wherein said silicone is a fluorosilicone.

5. The glue board and packaging assembly as claimed in claim 1 wherein said first substrate and said second substrate each comprise a generally rectangular member having a first and second relatively longer edge and a first and a second relatively shorter edge.

6. The glue board and packaging assembly as claimed in claim 5 in which said first substrate and said second substrate further comprise a plurality of score lines with each of said score lines extending between said first and said second relatively longer edge.

7. The glue board and packaging assembly as claimed in claim 5 wherein said first relatively shorter edge comprises a tab portion having tapered outer edges.

8. The glue board and packaging assembly as claimed in claim 5 wherein said first substrate and said second substrate further comprise an area adjacent to said second relatively shorter edge, and a slot formed in said area adjacent to said relatively shorter edge.

9. The glue board and packaging assembly as claimed in claim 5 wherein said first and said second substrates each further comprise:

an area adjacent said first relatively longer edge;

an area adjacent said second relatively longer edge;

an area adjacent said first relatively shorter edge;

an area adjacent said second relatively shorter edge with said areas adjacent said first and second relatively longer and said first and second relatively shorter edges free of said first and second adhesive layers.

10. The glue board and packaging assembly as claimed in claim 1 wherein said first substrate and said second substrate are made of cardboard.

11. The glue board and packaging assembly as claimed in claim 1 wherein said first substrate and said second substrate are made of paper board.

12. A glue board and packaging assembly as claimed in claim 1 in which said first substrate and said second substrate each comprise a first surface and a second surface with indicia formed on said first surface and on said second surface.

13. A glue board and packaging assembly as claimed in claim 1 wherein said release member is generally coextensive with said first substrate and said second substrate, and wherein said release member facilitates peeling said first and said second substrates apart.

* * * * *